UNITED STATES PATENT OFFICE.

RUDOLF KECK, OF DENVER, COLORADO.

COMPOSITION OF MATTER FOR FURNACE-LININGS OR OTHER PURPOSES.

SPECIFICATION forming part of Letters Patent No. 648,756, dated May 1, 1900.

Application filed October 4, 1899. Serial No. 732,532. (No specimens.)

*To all whom it may concern:*

Be it known that I, RUDOLF KECK, of Denver, in the county of Arapahoe and State of Colorado, have invented and produced a new and useful Composition of Matter for Furnace-Linings or other Purposes, of which the following is a full, clear, and exact description.

My invention relates to the manufacture of a mineral substance suitable for basic furnace-linings and primarily intended therefor, but also capable of other applications, such as linings for architectural walls or filtering purposes.

Basic linings for furnaces have generally been made in the form of bricks produced from magnesian minerals, such as dolomite or magnesite. In the production of such bricks the minerals are burned and then the caustic material is mixed with a small percentage of a binder such as tar or clay or ferruginous loam or a solution of alkaline silicate, &c., and then this mixture is burned at a very high heat. It is found, however, in practice that it is impossible to mix the magnesian minerals thoroughly with a small proportion of materials mentioned. Bricks prepared in the manner described if not used immediately in the furnaces will begin to disintegrate after a few days on account of absorption of the carbonic acid from the air by the caustic magnesia, while the caustic lime absorbs moisture and slakes, no matter how high the pressure may have been which was used in forming the bricks. The necessity of using a high pressure to form the bricks with such low percentage of binder is further disadvantageous in that it increases the heat conductivity of the finished article, and this of course is detrimental, since it will cause the exterior of the furnace-converter to become dangerously hot while the interior is correspondingly cool. This results in a considerable increase of time required for the converting operation. These drawbacks of the ordinary furnace-lining—namely, liability to disintegration and too great heat conductivity—are well known.

The object of my invention is to avoid these defects—that is, first to produce the mineral substance for the furnace-lining with the use of a moderate pressure only, so as to avoid the high density and heat conductivity resulting from the application of a very high pressure. On the other hand it has been my aim to find a material adapted for use as a flux or binder which could be used in large proportions with the magnesian minerals without any liability of subsequent disintegration. For this purpose I employ as a flux or binder the substance found along the eastern foot-hills of the Rocky Mountains, and I may use the whole material of the shale constantly occurring there in the Jura-Trias of the Mesozoic period. This material consists chiefly of thirty to fifty per cent. of silica and forty to fifty per cent. of alumina and oxids of iron, while the rest consists of carbonates of magnesia and lime. This material has valuable chemical and physical properties for the purpose of my invention and may be used just as it is obtained by pick and shovel, the only operation preparatory to mixing it with the magnesian material being crushing it to a fineness of an eighteen or twenty mesh sieve.

The proportion in which the binder or flux is to be mixed with the magnesian material depends on the percentage of the magnesium oxid and calcium oxid contained in said magnesian material. I have found that the best proportion is to use five pounds of crushed flux to seven pounds of magnesium oxid and calcium oxid contained in the magnesian material. In other words, if $n$ is the percentage of the magnesium oxid and calcium oxid contained in the magnesian material a hundred pounds of said material will have to be mixed with five-sevenths times $n$ pounds of crushed flux. The mixture is formed into bricks in the ordinary manner, the pressure used not being greater than that obtained with the common fire-brick hand-press. The bricks are then burned in the ordinary fire-brick furnace. The resulting product is a porous stone or brick which is hard and strong, which will not slake when exposed to moist air, and will not crumble after being used in a furnace. The stone or brick on account of its porosity is a comparatively bad conductor of heat and capable for the same reason of absorbing a considerable amount of phosphoric acid during the basic-steel process. When the bricks are intended for the latter process, I may slightly increase the proportion of the magnesian material in about the proportion of two pounds of crushed flux to three pounds of the magnesian material.

As the artificial stone produced in the manner above described is fireproof and comparatively light, it affords a good material for lining the walls of buildings, and owing to its low conductivity of heat it acts as a heat-insulator. The porosity of my improved artificial stone makes it adapted for use in filters and the like.

Having thus described my invention, I claim as new and desire to secure by Letters Patent—

1. The herein-described artificial stone, consisting of a magnesian material, and a binder or flux consisting of the material of the shale constantly occurring in the Jura-Trias along the eastern foot-hills of the Rocky Mountains, said stone being porous and a bad conductor of heat.

2. The herein-described artificial stone, consisting of a magnesian material, and a binder or flux consisting of the material of the shale constantly occurring in the Jura-Trias along the eastern foot-hills of the Rocky Mountains, in the proportion of about two parts of flux to three parts of magnesium oxid and calcium oxid contained in the magnesian material.

RUDOLF KECK.

Witnesses:
W. H. MARSH,
A. H. LOMAX.